J. S. HALL.
Shovel-Plow.
No. 11,456.  Patented Aug. 1, 1854.
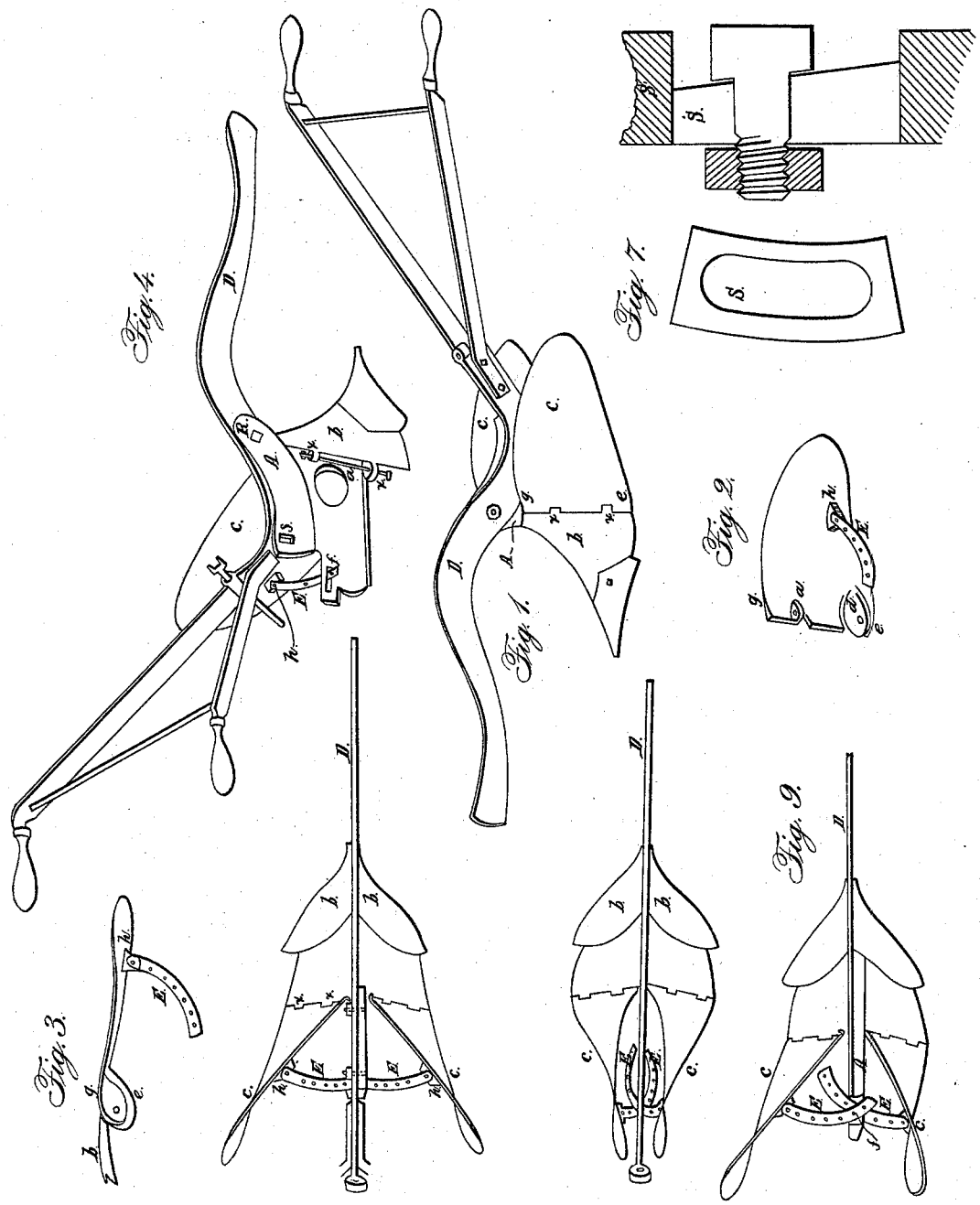

UNITED STATES PATENT OFFICE.

JOHN S. HALL, OF MANCHESTER, PENNSYLVANIA.

IMPROVEMENT IN PLOWS.

Specification forming part of Letters Patent No. 11,456, dated August 1, 1854.

*To all whom it may concern:*

Be it known that I, JOHN S. HALL, of Manchester, in the county of Allegheny and State of Pennsylvania, have invented a new and useful Improvement in Plows; and I do hereby declare that the following is a full, clear, and exact description of the same, reference being had to the accompanying drawings, forming a part of this specification.

The improvements I desire to secure by this application are on a plow for which Letters Patent were granted me February 7, 1854; and the nature of these improvements consists in the use of dissimilar-sized hinges by which the wing of single or the wings in double plows are attached to the permanent portion of the mold-board—that is, the lower stub or hinge being larger or more projective, I am thus enabled to raise the wings in proportion to their expansion, and by this means adapt the plow to its full work, and yet preserve the requisite form of mold-board under all its changes; and as a consequence the same implement may be advantageously applied to plowing sod, stubble, or marking in a minute's change of the arrangement. This preservation of form and adaptation in my former patent, wherein similar-sized hinges were used, was attended with difficulty—nay, did not result. In connection with this I am enabled, by means of the improved braces, to sustain the wings at their greatest expansion, and at the same time admit of extreme contraction (hitherto not attained) without destroying in the least degree the conformity of shape of mold-board.

By my improvement of the beveled or incline plane, slot, and head of bolt, I am enabled to confine the beam of iron to the iron standard (as it is peculiarly applicable to iron-beam plows) with greater security than has heretofore been effected.

There is a feature in this plow I would advert to—viz., in breaking out middles on hillside the mold-board on the one side may be contracted while the opposite one may be expanded to its greatest extent, and thus enable the plowman to mold the plant and well balance the plow. This improvement of the hinge, &c., is equally applicable to the single plow.

To enable others skilled in the art to make and use my invention, I will describe it as follows:

In the several drawings, A is the standard, cast in one piece with the sole and heel of the plow. $b$ is a portion of the mold-boards, also cast with A. It forms the cutting-edge or center of the fixed portion of these two mold-boards. On the rear edges of $b$ $b$ are cast stubs $x$ $x$, on which the hinged portion of the improved wings forming a part of the mold-boards are secured. (These are hinges more particularly described hereinafter.) The rear edge of $b$ is made to fit the curvature of the front edge of the wings, so as to overlap them at the joint, (and that in the direction of the furrow-slice,) and thus obviate a practical difficulty existing in all other plows, and which greatly affects their usefulness. $c$ $c$ are the portions denominated "wings." (See perspective, Figure 1, and inverted view, Fig. 2, and edge view, Fig. 3.) They are cast so as to conform with the general shape of mold-boards, yet different in the part I consider as new—viz., instead of the front edge, or that joining the rear edge of $b$, being straight, it is curved toward the inside of the mold-boards or returned, (see Fig. 3,) always observing to make the lower portion of the wing—viz., $e$—as much larger as the lower hinge is to be greater than the upper one, these hinges differing in size, or the circle they perform in opening, so that by this dissimilarity of size the extremity of the upper edge of the mold-boards are raised, while, in connection with the curved return above mentioned, the joint is kept tight, and the wing raised high enough when expanded for full work, and all this done without the least sacrifice of the requisite shape or form of the mold-boards. $a$ is a rod passing through the stubs $x$ $x$ and hinges $d$ $d$ on the wing. D is the beam, of wrought-iron. To the end the handles are secured by bolts. The beam is fastened to the front of the standard at R by a plain bolt and nut, serving as a fulcrum; but at its junction with the rear of the standard at S, Fig. 4, it is fastened with a beveled head-bolt passing through a segmental slot in the standard, whose bearing-edges in the recess under the head of the bolt form an incline plane, as seen in Fig. 7, on which the nut and bolt tighten after being screwed up, so as to prevent the slipping consequent to a plain bolt without the incline when attaching an iron beam to an iron standard—an evil found to exist in practice. E E are the segmental braces for sustaining the wings, and connected therewith by a socket and bolt, $h$, on which they hinge. They sustain the mold-boards under all their changes, and admit of extreme contraction (hitherto unattained) and expansion. They pass through an oblong slot, $f$, in the rear of the standard, and are there fastened with a removable pin in balancing the resistance on the upper wing (consequent when both are equally expanded) when used for hill-side cultivation. By this arrangement of the braces one may be contracted while the other remains expanded, and thus prevent the tendency to slide down hill in such culture. This contraction is seen in Fig. 9.

I do not claim the mere hinge-joint of the mold-board formed of similar-sized stubs, as that is the subject of a patent granted to me February 7, 1854; but

What I claim as my invention, and desire to secure by Letters Patent, is—

1. The dissimilar-sized hinges, as described, causing the wings of the mold-boards to rise in proportion to their expansion, in connection with the curved hinged braces E E, sustaining said wings $c\ c$ at their expansion, and admitting of extreme contraction without destroying the requisite form of the mold-board under all its changes, (a requisite hitherto not attained,) for the purpose of adapting the plow to a variety of work or uses.

2. The effectual securing of an iron beam to an iron standard by means of the inclined segmental slot S and bolt and nut, or their equivalent, operating in the manner described.

In testimony whereof I have hereunto signed my name before two subscribing witnesses.

JOHN S. HALL.

Witnesses:
   JOHN F. CLARK,
   SAML. GRUBB.